US 6,244,687 B1

(12) United States Patent
Gast et al.

(10) Patent No.: US 6,244,687 B1
(45) Date of Patent: Jun. 12, 2001

(54) MIXING OVERPRINTING AND UNDERPRINTING OF INKS IN AN INKJET PRINTER TO SPEED UP THE DRY TIME OF BLACK INK WITHOUT UNDESIRABLE HUE SHIFTS

(75) Inventors: Paul David Gast, Vancouver, WA (US); Keshava A Prasad, San Marcos, CA (US); Brooke E Smith, Brush Prairie, WA (US); Michel A. Riou, Milwaukie; Steven D Looman, Corvallis, both of OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/273,703

(22) Filed: Mar. 22, 1999

(51) Int. Cl.$^7$ ........................................ B41J 2/21
(52) U.S. Cl. ............................... 347/43; 347/15
(58) Field of Search ................... 347/43, 40, 41, 347/15, 12

(56) References Cited

U.S. PATENT DOCUMENTS

| | | | |
|---|---|---|---|
| 4,170,482 | * 10/1979 | Mansukhani | 347/100 |
| 4,413,275 | 11/1983 | Horiuchi et al. | 358/75 |
| 4,538,160 | 8/1985 | Uchiyama | 347/101 |
| 4,599,627 | 7/1986 | Vollert | 347/20 |
| 4,682,190 | 7/1987 | Ikeda | 347/132 |
| 4,683,492 | 7/1987 | Sugiura et al. | 358/80 |
| 4,694,302 | 9/1987 | Hackleman et al. | 347/43 |
| 4,831,409 | 5/1989 | Tatara et al. | 364/526 |
| 4,952,942 | * 8/1990 | Kanome et al. | 347/43 |
| 4,953,013 | 8/1990 | Tsuji et al. | 358/75 |
| 4,953,015 | 8/1990 | Hayasaki et al. | 358/79 |
| 5,057,852 | 10/1991 | Formica et al. | 347/43 |
| 5,153,617 | 10/1992 | Salmon | 347/115 |
| 5,168,552 | 12/1992 | Vaughn et al. | 315/109 |
| 5,226,175 | 7/1993 | Deutsch et al. | 395/119 |
| 5,283,671 | 2/1994 | Stewart et al. | 358/532 |
| 5,313,291 | 5/1994 | Appel et al. | 358/501 |
| 5,371,531 | 12/1994 | Rezanka et al. | 347/43 |
| 5,473,446 | 12/1995 | Perumal, Jr. et al. | 358/523 |
| 5,549,740 | 8/1996 | Takahashi et al. | 106/31.43 |
| 5,614,931 | * 3/1997 | Koike et al. | 347/43 |
| 5,626,655 | 5/1997 | Pawlowski et al. | 106/31.27 |
| 5,635,969 | 6/1997 | Allen | 347/101 |
| 5,638,101 | 6/1997 | Keefe et al. | 347/65 |
| 5,640,187 | 6/1997 | Kashiwazaki et al. | 347/101 |
| 5,648,806 | 7/1997 | Steinfield et al. | 347/87 |
| 5,680,519 | 10/1997 | Neff | 395/109 |
| 5,695,820 | 12/1997 | Davis et al. | 427/261 |
| 5,723,179 | 3/1998 | Wong et al. | 347/100 |
| 5,724,079 | * 3/1998 | Helinski et al. | 347/43 |
| 5,748,208 | * 5/1998 | Uchiyama et al. | 347/43 |
| 5,748,216 | 5/1998 | Scheffelin et al. | 347/87 |
| 5,767,876 | * 6/1998 | Koike et al. | 347/43 |
| 5,852,459 | 12/1998 | Pawlowski, Jr. et al. | 347/86 |

* cited by examiner

*Primary Examiner*—N. Le
*Assistant Examiner*—Lamson D. Nguyen

(57) ABSTRACT

A black printhead is installed in a scanning carriage with at least one primary color printhead on both sides of the black printhead. To reduce the drying time of a printed black ink pattern and to achieve other benefits, a first one of the primary color inks underprints the black ink in a first scan direction, and a second one of the primary color inks underprints the black ink in an opposite second scan direction. To minimize hue shifts due to the different underprinted colors, the black ink is overprinted, during the same scan that printed the underprinted ink and black ink, by a color ink that is different from the underprinted ink, so that the resulting black image printed in both scan directions will contain the same three color components. In one embodiment, the order of print cartridges in the scanning carriage, as viewed from the front of the printer, is cyan, black, magenta, and yellow. Other orders may also be used, and additional colors may be used. The invention is also applicable to a color printer using a single printhead with multiple sets of nozzles, each set printing a different color ink.

16 Claims, 5 Drawing Sheets

MIXING OVERPRINTING AND UNDERPRINTING OF INKS IN AN INKJET PRINTER TO SPEED UP THE DRY TIME OF BLACK INK WITHOUT UNDESIRABLE HUE SHIFTS

FIELD OF THE INVENTION

This invention relates to inkjet printers and, in particular, to a printing technique for reducing the dry time of black ink in a color printer.

BACKGROUND

Inkjet printers are well known and extremely popular. Details of a particular inkjet printer are described in U.S. Pat. No. 5,648,806, entitled Stable Substrate Structure for a Wide Swath Nozzle Array in a High Resolution Inkjet Printer, by Steven Steinfeld et al., assigned to the present assignee and incorporated herein by reference.

An inkjet printer ejects fine droplets of ink onto a print medium, typically paper, in response to electrical signals generated by a microprocessor. A typical inkjet printhead has an array of precisely formed nozzles overlying a printhead substrate. The substrate incorporates an array of firing chambers (or drop ejection chambers) that receive liquid ink through ink channels connected to one or more ink reservoirs. Each firing chamber typically has a thin-film resistor or a piezoelectric element which, when energized, causes a droplet of ink to ejected through an associated nozzle onto the medium as the printhead scans across the medium. Energizing a thin-film resistor heats the resistor to vaporize a portion of ink in the firing chamber to cause a droplet of ink to be ejected from its associated nozzle. Energizing a piezoelectric crystal causes the crystal to expand to propel a droplet of ink from a nozzle.

High quality color inkjet printers include printheads for the three primary color inks, cyan, magenta, and yellow, and a separate printhead for black ink. One type of color inkjet printer incorporates a separate replaceable print cartridge for each of the four colors of ink installed in a scanning carriage. Another type of color inkjet printer incorporates two, three, or four different color printheads in the same print cartridge. Still another type of color inkjet printer uses a single printhead (having a single substrate), having multiple sets of nozzles, that ejects a different color ink (e.g., CMY) through each set of nozzles. Some color printers use more than four colors of ink, with a separate printhead for each color. The order of printheads in the carriage is typically black on the left side or right side of the primary color cartridges, with the order of the primary color cartridges being arbitrary.

A common black ink is a pigment-based ink where undissolved particles are suspended in a clear solution. Such pigment-based ink creates the darkest black with a minimum of bleed into the paper. Since the paper is typically white, any significant bleeding of the black ink into the paper will noticeably reduce the sharpness of the edges of black text or other black print.

For color inks, dye-based inks are very popular. Dye-based inks do not have color particles suspended in solution and thus tend to bleed into the paper more than pigment-based inks. This bleeding is not noticeable due to the relatively low contrast between the white paper and the color ink. Since the dye-based ink wicks or bleeds into the paper, the dye-based inks dry faster than the pigment-based black inks, which effectively pool on the paper surface. Color inks may also be pigment-based.

Examples of such black inks and color inks are described in U.S. Pat. Nos. 5,695,820 and 5,626,655 assigned to the present assignee and incorporated herein by reference.

As inkjet printers evolve to print faster, there is less time for the ink to dry. In some cases, after printing on a page is complete, the printer needs to hold onto the page for a predetermined time in order to let the ink dry before depositing the page in an output tray. The drying of the black ink is likely to be the bottleneck for drying time of a page.

What is needed is a technique for reducing the drying time of inks deposited by an inkjet printer.

SUMMARY

In accordance with one embodiment of the present invention, a black printhead is installed in a scanning carriage with at least one primary color ink printhead on both sides of the black ink printhead. In one embodiment, the color inks are the type which wick into a standard sheet of paper faster than the black ink. These types of color inks contain surfactants. The color inks will typically be dye-based (but may also be pigment-based) and the black ink will typically be pigment-based. In another embodiment, the color inks are either dye-based or pigment-based and react with the black ink to precipitate out the black ink pigment so as to dramatically speed the drying time of the black ink. These types of color inks contain reactants. Useful color inks may also contain both surfactants and reactants.

In one embodiment of the invention, to reduce the drying time of black ink, an amount of one of the primary color inks is deposited on the paper where the black ink is intended to be subsequently deposited during the same pass across the paper. This is referred to as underprinting. During the same pass of the carriage across the paper, the black ink is then deposited over the primary color ink. Since primary color printheads are located on both sides of the black printhead, this printing technique may be accomplished whether the carriage scans from left to right or from right to left. The wicking of the small amount of primary color ink into the paper ("wetting" the paper) also causes some wicking of the black ink solution into the paper while the black pigment remains on the surface of the paper. There is no noticeable bleeding of the black ink. The dispersion of the black ink solution into the paper causes the black ink to dry faster than had the black ink been the only ink printed.

In the embodiment where the color inks react with the black ink to precipitate out the black pigment, wicking of the color ink into the paper is not necessary (although wicking may occur if the ink contains reactants and surfactants). The underprinted color ink reacts with the black ink to reduce drying time.

The primary color ink beneath the black ink will be different for the two carriage scan directions. Changing the underprinted color from, for example, cyan to magenta during consecutive scans will cause a shift in the hue of the black ink from one swath to another.

In one embodiment of the invention, to avoid this hue shift, after the black ink is printed over the primary color ink (e.g., magenta), another primary color ink is then printed over the black ink during the same scan, such that three layers of ink form the black printed image. This is referred to as overprinting.

In the example above, black is printed using a combination of underprinted cyan, black, and overprinted magenta when the carriage scans from left to right, and black is printed using a combination of underprinted magenta, black, and overprinted cyan when the carriage scans from right to left so that no hue shift will occur when the carriage prints in both directions. If the color effect of the underprinted color ink is less then the color effect of the overprinted color ink, the optimum amount of overprinted color ink will be less than the underprinted color ink. The proper amounts of underprinted and overprinted inks should be determined empirically. In one embodiment, the amounts of underprinted and overprinted inks are symmetrical, but the amounts of underprinted and overprinted inks when scanning from left-to-right may be different from the amounts going from right-to-left.

In one embodiment, the order of print cartridges in the scanning carriage, as viewed from the front of the printer, is cyan, black, magenta, and yellow. In another embodiment, the order is cyan, black, yellow, and magenta. All other orders where black is not located at the ends are envisioned. If a single printhead using multiple sets of nozzles, one set per color, is used, then the black set of nozzles is to be located between two primary color sets.

In another embodiment, the color printer uses a two-pass technique, or other multiple pass technique, where multiple passes over the same area are needed to complete the printing across a page. In such multiple pass printers, the black ink printhead (or set of nozzles) need not be located between two other color printheads or sets of nozzles.

DETAILED DESCRIPTION

Figure 1:
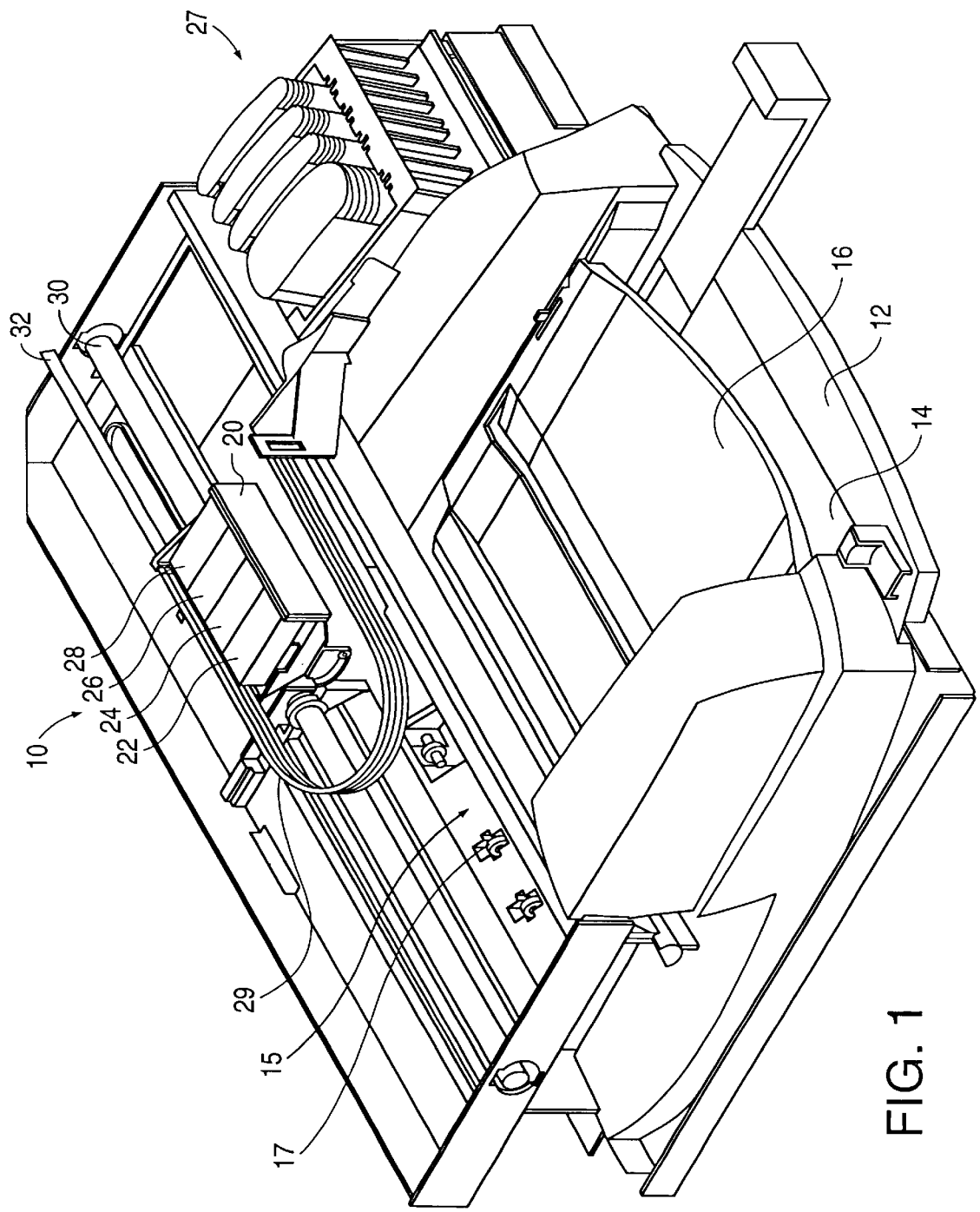
FIG. 1 illustrates one of many examples of an inkjet printer that could incorporate the present invention.
Figure 2:
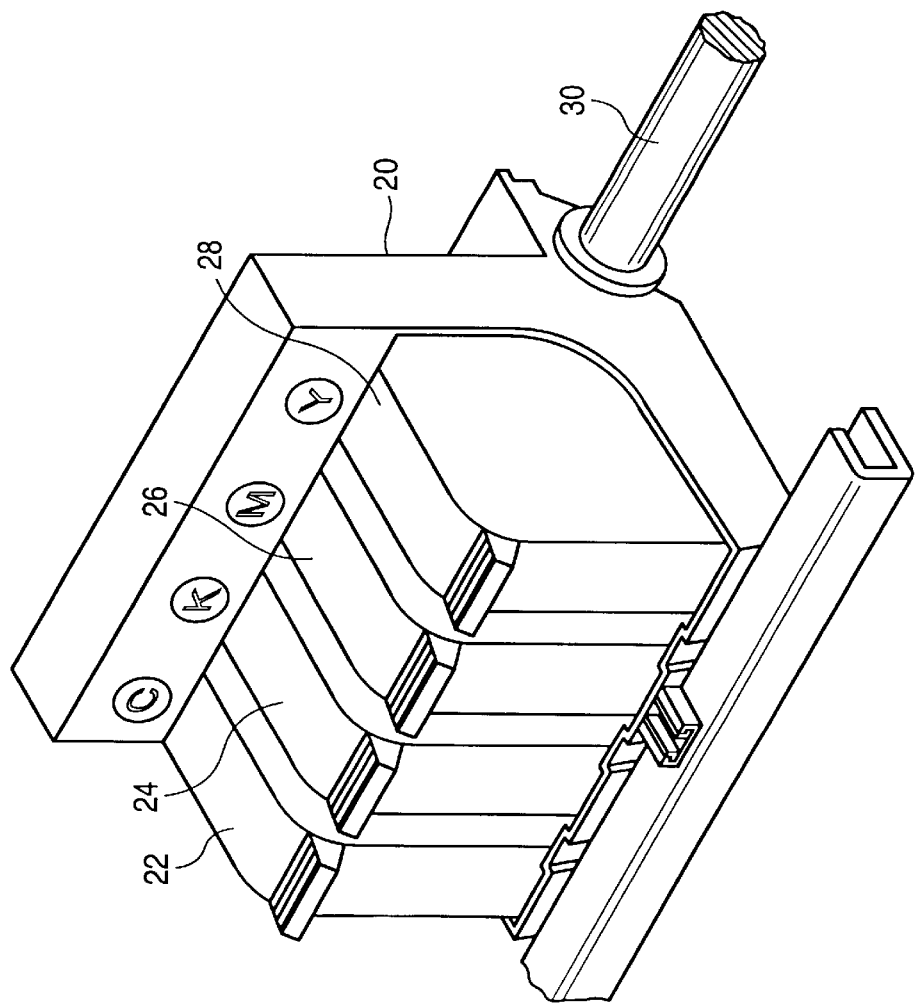
FIG. 2 illustrates the scanning carriage in the printer of FIG. 1 and the order of print cartridges in the carriage.

FIG. 1 illustrates an inkjet printer 10 with the typical order of print cartridges within its scanning carriage changed, as shown in FIG. 2, to carry out the invention. Numerous other designs of inkjet printers may also be used while carrying out this invention. More detail of an inkjet printer is found in U.S. Pat. No. 5,852,459, issued Dec. 22, 1998 to Norman Pawlowski et al., incorporated herein by reference.

Inkjet printer 10 includes an input tray 12 containing sheets of paper 14 which are forwarded through a print zone 15, using rollers 17, for being printed upon. The paper 14 is then forwarded to an output tray 16. A moveable carriage 20 holds print cartridges 22, 24, 26, and 28, which respectively print cyan (C), black (K), magenta (M), and yellow (Y) inks. In one embodiment, inks from ink cartridges 27 are supplied to their associated print cartridges via flexible ink tubes 29.

The print cartridges may also be the type that hold a substantial supply of ink. In another embodiment, the ink supplies are separate from the printhead portions and are removeably mounted on the printheads in the carriage.

The carriage 20 is moved along a scan axis by a conventional belt and pulley system and slides along a slide rod 30.

Printing signals from a conventional external computer (e.g., a PC) are processed by printer 10 to generate a bitmap of the dots to be printed. The bitmap is then converted into firing signals for the printheads. The position of the carriage 20 as it traverses back and forth along the scan axis while printing is determined from an optical encoder strip 32, detected by a photoelectric element on carriage 20, to cause the various ink ejection elements on each print cartridge to be selectively fired at the appropriate time during a carriage scan.

FIG. 2 illustrates one example of carriage 20 with print cartridges 22, 24, 26, 28 installed in the order of C, K, M, and Y as viewed from the front of printer 10. Typically, color printers have the K print cartridge at either of the extreme ends in the carriage.

If a color inkjet printer having the order of print cartridges in FIG. 2 (or other orders mentioned herein) were the type that had off-carriage ink supplies, such as shown in FIG. 1, the order of ink supplies would match the order of the print cartridges in the carriage. For example, the order of the ink supply cartridges 27 in FIG. 1 will be CKMY if the arrangement of FIG. 2 is used. The correspondence of the arrangements of the ink cartridges and print cartridges is both for readily associating an ink cartridge with a print cartridge and for ease of routing of the ink tubes 29.

Figure 3:
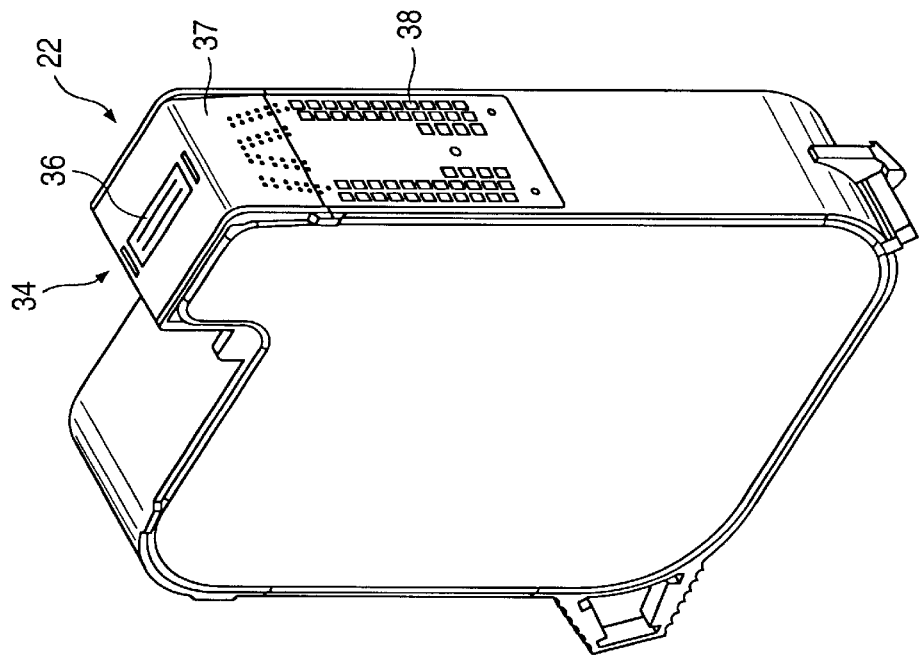
FIG. 3 is a perspective view of one of the print cartridges.

FIG. 3 is a perspective view of a print cartridge which may serve as any of the print cartridges in carriage 20, such as print cartridge 22. Print cartridge 22 contains a reservoir of ink, or has an ink passage connected to an off-axis ink supply, which is connected to a printhead portion 34. The printhead portion 34 basically consists of a printhead substrate containing ink channels leading to chambers surrounding ink ejection elements. A nozzle plate 36 is positioned over the substrate with each nozzle overlying an ink ejection chamber. In one embodiment, nozzles are formed in a flexible tape (a TAB circuit 37). Contact pads 38 contact electrodes in carriage 20 and supply electrical signals to the printhead substrate via traces on the TAB circuit 37.

The printhead may use resistive, piezoelectric, or other types of ink ejection elements.

As the print cartridges in carriage 20 in FIG. 2 scan across a sheet of paper, the swaths printed by the print cartridges overlap. After one or more scans, the sheet of paper 14 is shifted in a direction towards the output tray 16 (FIG. 1), and the carriage 20 resumes scanning. It is important that the same color swaths printed during each scan not significantly vary in hue, otherwise noticeable banding results.

As previously explained, in the prior art, the drying time for black ink is typically longer than the drying time for the color inks due to the different types of inks used. Black ink is preferably pigment-based (although it may be dye-based) while primary color inks are typically dye-based. Since the black ink is specifically engineered not to bleed into the paper, the black ink typically has a longer drying time than the color inks. Thus, the black ink drying time frequently becomes the bottleneck for the drying time of a sheet of paper. The below technique, also shown in the flowchart of FIG. 6, speeds up the drying time of black ink.

Figure 4A:
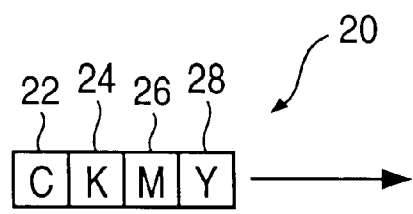
FIG. 4A illustrates the printing of a portion of a text character while scanning from left to right.

FIG. 4A illustrates the carriage 20 in FIG. 2 being scanned from left to right while printing a black pattern on the paper.

For simplicity, this black pattern is assumed to be the letter "T". Initially, a printing signal is received by the printer identifying that a black ink pattern (e.g., a "T") is to be printed in a certain location on the paper. The print engine determines that the top portion of the "T" will be printed in scan 1 (Step 1 in FIG. 6). In this example, "T" will be printed in two adjacent swaths.

Figure 4B:
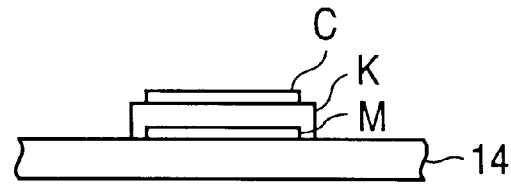
FIG. 4B is a cross-section of the text character portion printed during the scan of FIG. 4A.
Figure 4C:
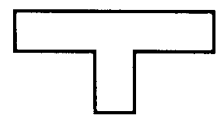
FIG. 4C is a top down view of the portion of a letter "T" printed during the scan.
Figure 6:
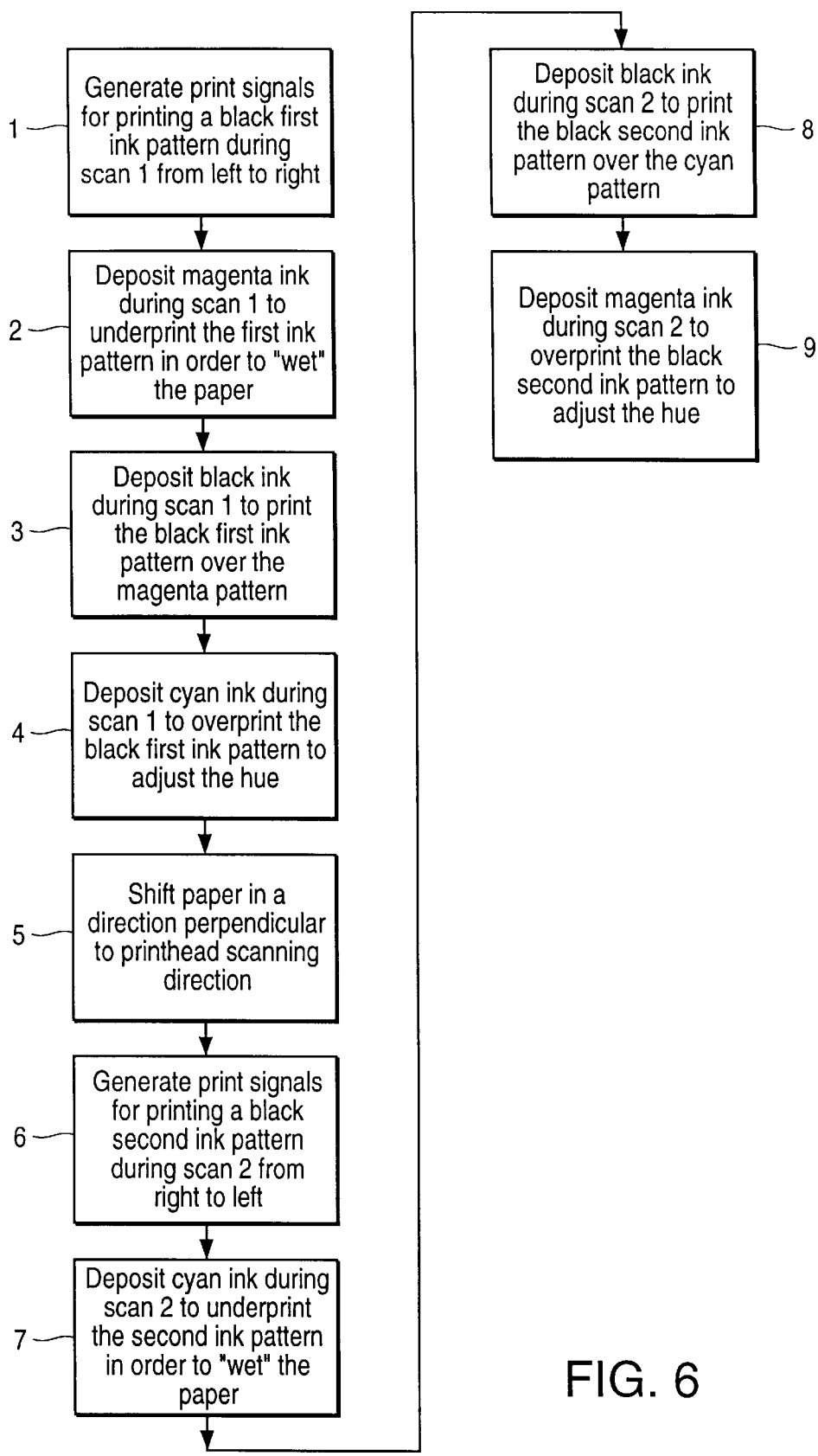
FIG. 6 is a flowchart illustrating the basic steps used in one embodiment of the invention.

FIG. 4B illustrates that, as the carriage 20 is scanning from left to right, the magenta print cartridge 26 prints a pattern of magenta ink beneath where the black ink is to be subsequently deposited (Step 2 in FIG. 6). This will be referred to as underprinting. The pattern is shown in FIG. 4C.

In one embodiment, the volume of the underprinted magenta ink deposited is about 25 percent of the volume of black ink to be deposited. However, the relative volume is to be based on the particular inks used and, therefore, an optimal amount cannot be specified herein. The volume of the underprinted ink may range, for example, between 10 to 50 percent of the black ink volume. In one example, the volume of each color ink drop may be about 4 picoliters, and the volume of each black ink drop may be about 18 picoliters. If a single color dot was printed for each black dot, the volume of the underprinted ink would be around 25 percent of the volume of the black ink. In those cases where a lower volume of color ink is needed, various pixel positions may have no color dots printed. In those cases where a higher volume of color ink is needed, various pixel positions may have multiple color dots printed so that the desired average volume is met. Well known depletion algorithms may be used for this purpose.

In cases where drop volumes vary from printhead to printhead, the number of drops per pixel may need to be determined once the print cartridge has been tested to determine its drop volume. In one embodiment, the drop volume for a printhead is stored in a memory chip attached to the print cartridge and later accessed by the printer to determine the required number of dots per pixel to achieve the desired average ink volume.

In one embodiment, the underprinted ink need not be printed entirely beneath the black ink or exactly underneath each black dot printed. FIG. 4B shows that the underprinted magenta ink does not extend to the edges of the "T". This is to ensure that no color coronas are visible around the edges of characters or graphics. Additionally, since the color ink slightly spreads, as does the black ink, each magenta dot printed need not precisely underlie a subsequent black dot printed.

Also during the scan from left to right, as the black print cartridge 24 scans over the area in which a "T" is to be printed, the nozzles in the black printhead 24 print the full density of black ink (e.g., greater than 90 percent density) over the magenta ink to print the letter "T" portion in the swath (Step 3). This assumes a single scan print mode rather than a multi-scan print mode.

When the black ink is deposited over the magenta ink, the magenta ink is still wet, and the wetting of the paper from the magenta ink draws some of the black ink solution into the paper to quicken its drying time. The pigment in the black ink does not bleed into the paper. In this example, the magenta ink acts as a surfactant.

In another embodiment, the color inks react with the black ink to precipitate out the black pigment and quickly solidify the pigment. These color inks are referred to as reactants. Reactants also serve to prevent bleeding of the black ink into any adjacent color ink patterns.

The resulting color is now primarily black with a tint of magenta. As will be described in greater detail below, in an enhancement of the invention, to avoid any hue shifts from one swath to another as the carriage prints from left to right and from right to left, the cyan print cartridge 22 is then energized during the scan to print over the black ink (Step 4). In one embodiment, the volume of overprinted ink is symmetrical with the volume of the underprinted ink for a particular scan direction. In other embodiments, the volumes are different in order to achieve the desired results.

Thus, in the first pass shown in FIG. 4B, the magenta ink is for reducing the drying time of the black ink, and the cyan ink is for matching the overall color of the "T" with the black color printed during the next swath when the carriage prints from right to left. The paper is then shifted in a direction perpendicular to the scan direction (Step 5), assuming a single scan print mode. If the print mode uses multi-pass print mode, the paper would not be shifted. The print engine now determines that the bottom portion of the "T" is to be printed in scan 2 (Step 6). Step 6 may occur at any time in the process.

Figure 5A:
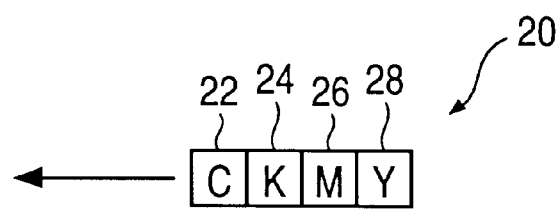
FIG. 5A illustrates the printing of the bottom portion of the "T" during a scan from right to left.
Figure 5B:
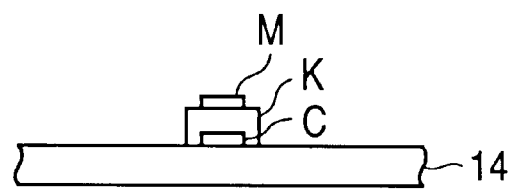
FIG. 5B is a cross-section of the text character portion printed during the scan of FIG. 5A.

In FIG. 5A, carriage 20 prints from right to left to complete the letter "T" or other black image being printed. Since the cyan print cartridge 22 now leads the black print cartridge 24, the cyan ink is deposited on the paper to wet the paper prior to the black ink being deposited, as shown in FIG. 5B (Step 7). Black ink is then deposited to print the bottom portion of the "T" over the cyan ink (Step 8). The magenta print cartridge 26 is then energized to print magenta ink over the black ink so that the resulting hue of the bottom portion of the "T" matches that of the top portion of the "T" (Step 9). The color inks may be surfactants or reactants and achieve similar results.

Figure 5C:
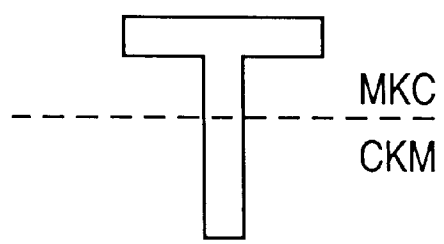
FIG. 5C is a top down view of the completed letter "T" printed using the two scans with no perceptible hue shift.

FIG. 5C shows the two portions of the "T" printed during two scans of the carriage 20, with the paper being shifted between each scan.

In another embodiment, any other order of the color print cartridges may be used to produce the same result, such as CKYM, MYKC, etc. The black printhead in a bi-directional type printer has at least one color printhead located on each side. The underprinting or overprinting printheads need not be adjacent to the black printhead.

Figure 7:
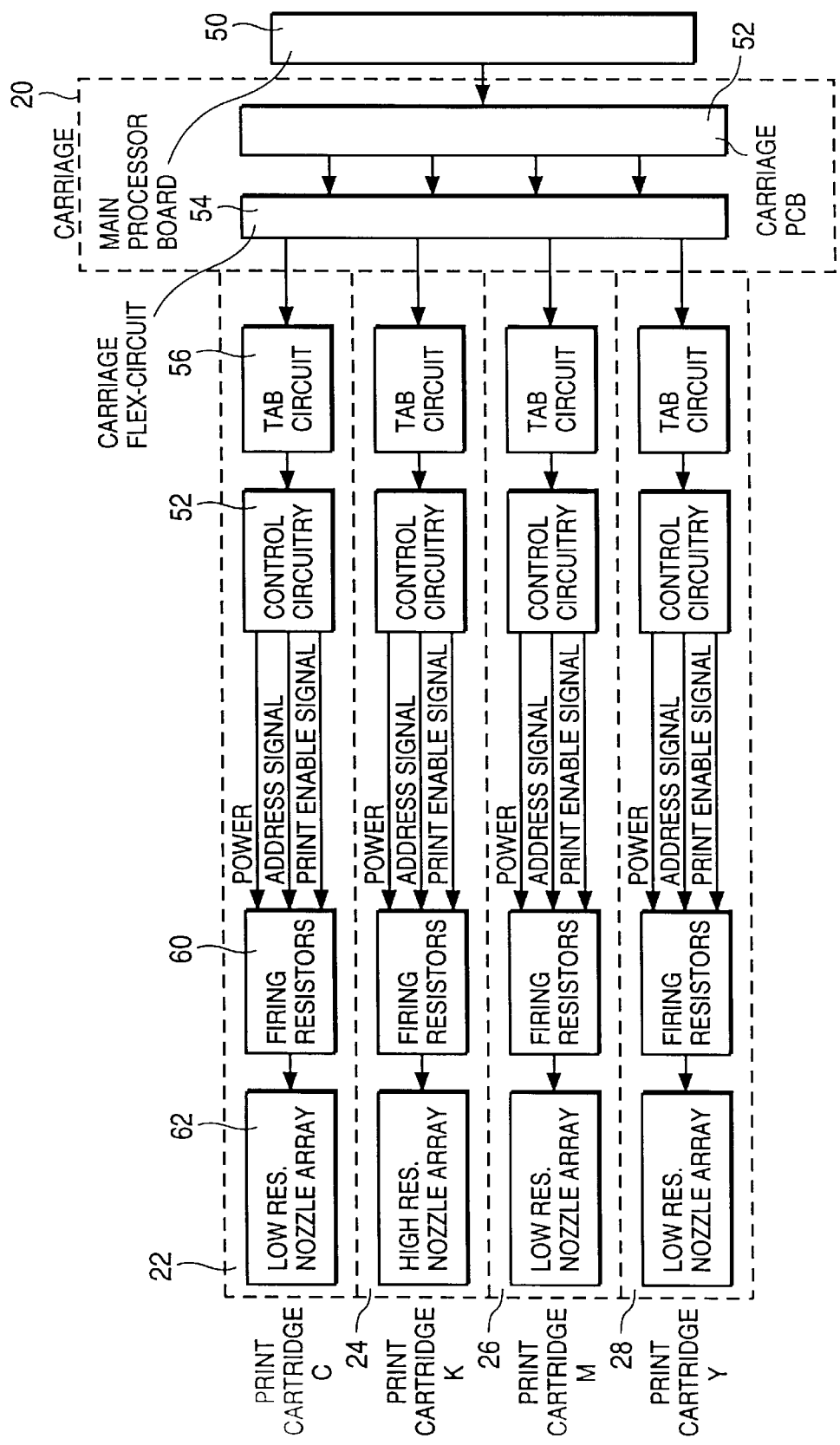
FIG. 7 illustrates the electronics within the printer for creating the energization signals for the various printheads to print in accordance with one embodiment of the invention.

FIG. 7 illustrates the basic circuitry in the print cartridges, carriage 20, and printer 10 for generating the firing signals for the heater resistors in the printheads. The main processor board 50 in the printer performs the well known steps of decoding the print signals from the personal computer connected to an input of the printer and creating a bitmap of the dots to be printed in a swath buffer forming part of the main processor board 50. Additional details of one technique for creating the bitmap of the dots is found in U.S. Pat. No. 5,805,174, entitled Display List Architecture Having Two Dimensional Array of Zones, by Padmanabhan Ramchandran, assigned to the present assignee and incorporated herein by reference. The data is transferred to the carriage printed circuit board 52, which uses timing signals from the optical encoder strip 32 (FIG. 1) to generate the addressing signals for firing selected heater resistors in a particular printhead. A carriage flex circuit 54 contains electrodes for being contacted by the contact pads on the print cartridge TAB circuit 56. A control circuit 58 on the printhead distributes the signals to the various heater resistor circuits. The heater (or firing) resistors 60 vaporize a portion of the ink in their associated chambers to expel a droplet of ink through an associated nozzle in a nozzle array 62.

In one embodiment, the black print cartridge 24 has a dot resolution (e.g., 600 dpi) higher than that of the color printheads (e.g., 300 dpi). Multiple printheads may be located in the same print cartridge. In one example, a single print cartridge contains four printheads in the order of CKMY. In another embodiment, one print cartridge contains cyan and black printheads, while another print cartridge contains magenta and yellow printheads. In another embodiment, one print cartridge contains a single printhead with three or more sets of nozzles, where each set of nozzles ejects a different color of ink.

The above description has focused on single pass type printers where the paper is shifted a swath width after a single pass. However, the underprinting and overprinting can also be used in a multiple pass mode of printing where swaths in two consecutive scans either fully or partially overlap. In such a multipass printer, the black printhead (or set of nozzles) need not have other color printheads (or sets of nozzles) on both sides of it since the overprinting and underprinting can be done in two separate passes.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a bi-directional inkjet printer to underprint a black image on a medium, said printer having a scanning carriage for scanning a plurality of print cartridges, each print cartridge having a printhead, across said medium while said printheads are printing on said medium, said printheads including a first set of nozzles located in said carriage for printing cyan ink, a black set of nozzles for printing black ink, and a second set of nozzles for printing magenta ink, said method comprising:
   (a) printing said cyan ink from said first set of nozzles during a first scan in a first direction;
   (b) printing black ink from said black set of nozzles over said cyan ink during said first scan;
   (c) printing said magenta ink from said second set of nozzles during a second scan in a second direction opposite said first direction; and
   (d) printing black ink from said black set of nozzles over said magenta ink during said second scan,
   wherein an order of said plurality of print cartridges in said carriage along said first direction is a first print cartridge for printing cyan ink, a black print cartridge for printing black ink, and a second print cartridge for printing magenta ink.

2. The method of claim 1 further comprising:
   (e) printing said magenta ink by said second set of nozzles over said black ink during said first scan, said black image being at least partially printed by the combination of said cyan ink, said black ink, and said magenta ink; and
   (f) printing said cyan ink by said first set of nozzles over said black ink during said second scan, said black imaging being at least partially printed by the combination of said magenta ink, said black ink, and said cyan ink.

3. The method of claim 1 further comprising:
   shifting said medium in a direction perpendicular to said first direction after said first scan.

4. The method of claim 1 wherein said plurality of print cartridges further includes a third print cartridge for printing yellow ink.

5. The method of claim 1 wherein each print cartridge of said plurality of print cartridges is a separate replaceable unit.

6. The method of claim 1 wherein said first scan and said second scan are successive scans of said carriage across said medium.

7. The method of claim 1 wherein said black ink is a pigment-based ink, and said cyan ink and said magenta ink are dye-based inks.

8. The method of claim 1 wherein said black ink, said cyan ink, and said magenta ink are all pigment-based inks.

9. The method of claim 1 wherein said printing of said cyan ink comprises a volume of said cyan ink less than a volume of said black ink printed over said cyan ink.

10. The method of claim 9 wherein said volume of said cyan ink beneath said black ink is about 10 to 50 percent of said volume of said black ink.

11. The method of claim 9 wherein said volume of said cyan ink beneath said black ink is different from a volume of said magenta ink beneath said black ink.

12. An apparatus in a bi-directional inkjet printer comprising:
   a scanning carriage for scanning across a medium;
   a plurality of print cartridges each print cartridge having a printhead, said printheads including a first set of nozzles located in said carriage for printing cyan ink, a black set of nozzles for printing black ink, and a second set of nozzles for printing magenta ink, said black set of nozzles being located in said carriage between said first set of nozzles and said second set of nozzles, an arrangement of said first set of nozzles, said black set of nozzles, and said second set of nozzles in said carriage allowing said black ink to be underprinted by said cyan ink in a first scan direction and underprinted by said magenta ink in a second scan direction, opposite said first scan direction,
   wherein an order of said plurality of print cartridges in said carriage along said first scan direction is a first print cartridge for printing cyan ink, a black print cartridge for printing black ink, and a second print cartridge for printing magenta ink.

13. The apparatus of claim 12 wherein said plurality of print cartridges further includes a third print cartridge for printing yellow ink.

14. The apparatus of claim 12 wherein each print cartridge of said plurality of print cartridges is a separate replaceable unit.

15. The apparatus of claim 12 wherein said black in, said cyan ink, and said magenta ink are all pigment-based inks.

16. The apparatus of claim 12 wherein said black ink is a pigment-based ink, and said cyan ink and said magenta ink are dye-based inks.

* * * * *